United States Patent [19]

Nobusawa et al.

[11] Patent Number: 5,390,357
[45] Date of Patent: Feb. 14, 1995

[54] POWER SAVING DIVERSITY RECEIVER

[75] Inventors: Hideaki Nobusawa, Tokyo; Hideaki Tashiro, Kanagawa, both of Japan

[73] Assignee: NEC Corporation, Tokyo, Japan

[21] Appl. No.: 936,317

[22] Filed: Aug. 28, 1992

[30] Foreign Application Priority Data

Aug. 28, 1991 [JP] Japan .................................. 3-216789

[51] Int. Cl.$^6$ ............................................. H04B 7/08
[52] U.S. Cl. .................. 455/134; 455/277.1;
455/277.2; 455/343
[58] Field of Search ............... 455/132, 133, 134, 137,
455/140, 272, 277.1, 65, 343, 135, 275, 276.1,
277.2; 375/100; 333/204

[56] References Cited

U.S. PATENT DOCUMENTS

| 4,015,205 | 3/1977 | Ikeda et al. ......................... 455/133 |
| 4,696,058 | 9/1987 | Tachita et al. . | |
| 4,823,398 | 4/1989 | Hashimoto ........................... 455/134 |
| 5,152,009 | 9/1992 | Sato ..................................... 455/134 |

FOREIGN PATENT DOCUMENTS 0227458  7/1987  European Pat. Off. .
2065533  3/1990  Japan .
2271724 11/1990  Japan .

OTHER PUBLICATIONS

Patent Abstracts of Japan, vol. 14, No. 241, 22 May 1990 (Document No. 2065533).
Patent Abstracts of Japan, vol. 15, No. 29, 23 Jan. 1991 (Document No. 2271724).

*Primary Examiner*—Curtis Kuntz
*Assistant Examiner*—Nguyen Vo
*Attorney, Agent, or Firm*—Sughrue, Mion, Zinn, Macpeak & Seas

[57] ABSTRACT

In a diversity receiver, each of first and second diversity branches includes an antenna and a high-frequency amplifier coupled thereto. A diversity decision circuit is coupled to the outputs of the amplifiers to generate a switching control signal identifying one of the outputs of the diversity branches having a higher field intensity value. A power switching circuit is provided for coupling a voltage source to one of the amplifiers according to the switching control signal so that power supply to the other amplifier is cut off.

5 Claims, 1 Drawing Sheet

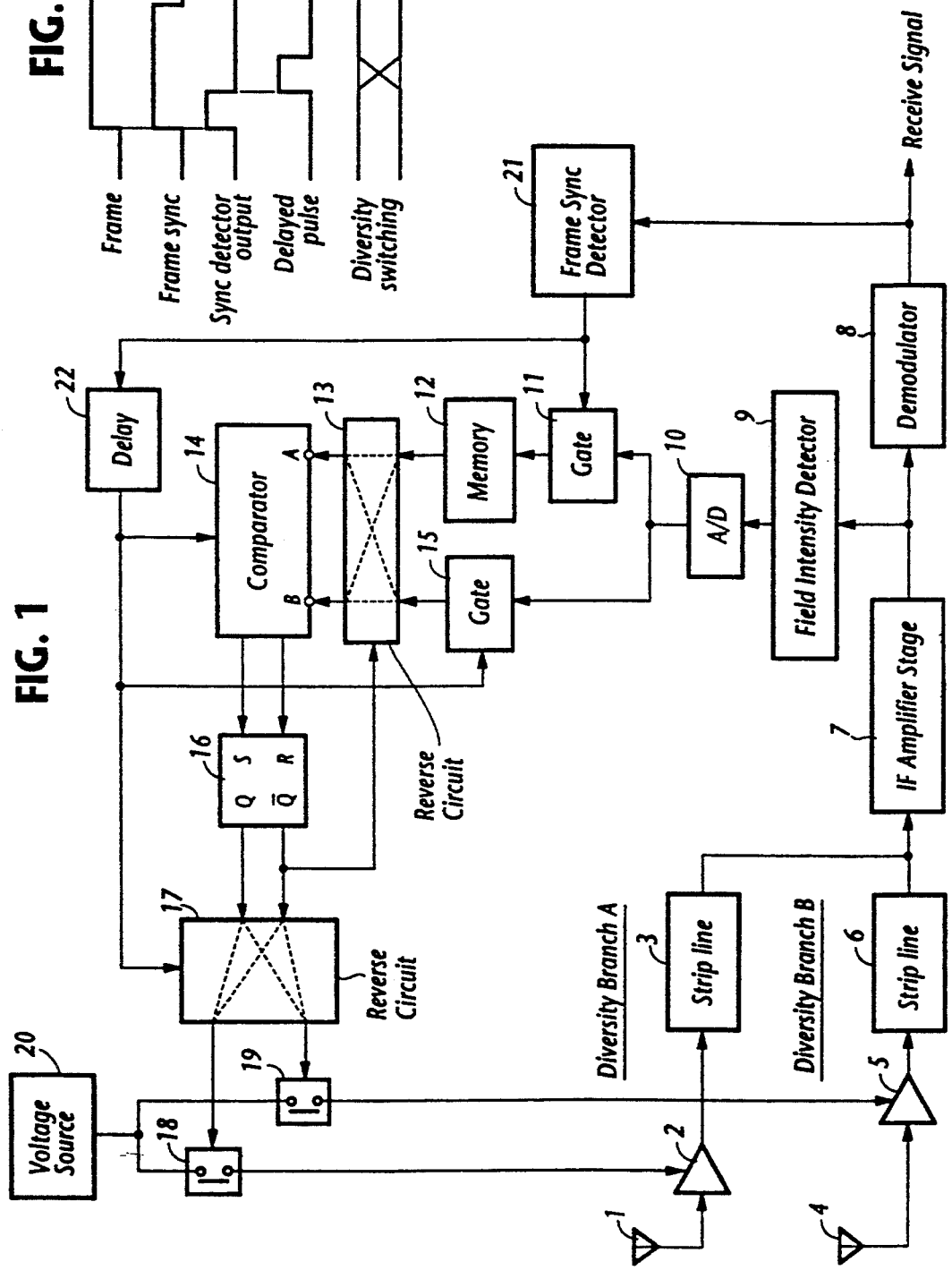
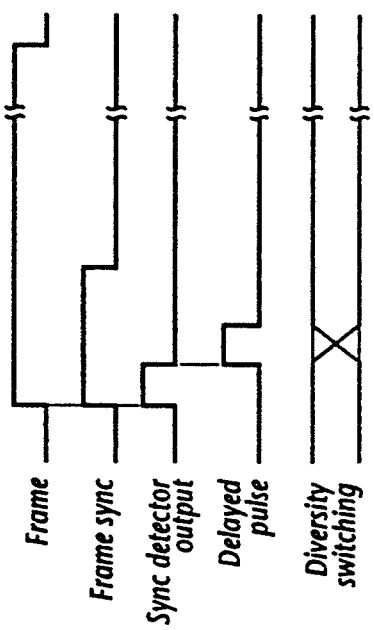

POWER SAVING DIVERSITY RECEIVER

BACKGROUND OF THE INVENTION

The present invention relates to a diversity receiver.

With conventional diversity receivers, all diversity branches are constantly power-fed even though only one of the branches is switched into circuit to select the strong signal. For power savings purposes, it is desirable to minimize the amount of power consumed by diversity branches.

SUMMARY OF THE INVENTION

It is therefore an object of the present invention to provide a power saving diversity receiver in which power supply to each diversity branch is cut off when it is out of circuit.

According to the present invention, the diversity receiver includes first and second diversity branches for respectively receiving a transmitted radio-frequency signal, the diversity branches respectively having first and second high-frequency amplifiers for amplifying the received signal to produce first and second diversity branch output signals. A diversity decision circuit is coupled to the diversity branches for generating a switching control signal identifying one of the outputs of the first and second diversity branches having a higher field intensity value. A power switching circuit is provided for coupling a voltage source to one of the high-frequency amplifiers in response to the switching control signal so that one of the first and second diversity branches is exclusively rendered active. Preferably, the outputs of the diversity branches are coupled by respective strip lines to the diversity decision circuit to prevent mutual interference which might occur between the diversity branches.

The diversity decision circuit preferably includes a field intensity detector coupled to the outputs of first and second diversity branches to produce an intensity signal. First and second sampling circuits are provided. The first sampling circuit samples the intensity signal at periodic intervals and the second sampling circuit causes the power switching circuit to deactivate the active diversity branch and activate the inactive diversity branch when the intensity signal is sampled by the first sampling circuit and then samples the intensity signal. The intensity signal sampled by the first and second sampling circuits are compared with each other to derive the switching control signal.

BRIEF DESCRIPTION OF THE DRAWINGS

The present invention will be described in further detail with reference to the accompanying drawings, in which:

FIG. 1 is a block diagram of a diversity receiver of this invention; and

FIG. 2 is a timing diagram of the diversity receiver.

DETAILED DESCRIPTION

As shown in FIG. 1, the diversity receiver of this invention comprises a first diversity branch A comprising an antenna 1, a high-frequency amplifier 2 and a strip line 3 and a second diversity branch B identically comprising an antenna 4, a high-frequency amplifier 5 and a strip line 6. High-frequency amplifiers 2 and 5 are power-fed from a voltage source 20 through power switches 18 and 19, respectively, for amplifying a radio-frequency signal received by the associated antenna.

The outputs of the amplifiers 2 and 5 are respectively applied to the associated strip lines 3 and 6 whose outputs are connected together to the input of an intermediate frequency stage 7. The use of the strip lines is to prevent mutual interference between the two diversity branches. The output of IF stage 7 is applied to a demodulator 8 whose output is supplied as a receive signal to known utilization circuitry, not shown.

The output of IF stage 7 is also applied to a field intensity detector 9 where the field intensity of the output of one of the diversity branches is determined and applied to an analog-to-digital converter 9 where the intensity signal is converted to digital form. The output of A/D converter 10 is fed through a first path including a gate 11 and a memory 12 to one input of a reverse circuit 13 and thence to a first input terminal A of a comparator 14 and simultaneously applied through a second path formed by a gate 15 to the other input of reverse circuit 13 and thence to a second input terminal B of comparator 14. Comparator 14 compares the signal at terminals A and B and supplies a logic-1 output to the set input of a flip-flop 16 when the signal at terminal A is greater than the signal at terminal B and supplies a logic-1 output to the reset input of flip-flop 16 when the signal at terminal B is greater than the signal at terminal A.

The true and complementary outputs of flip-flop 16 are coupled through a reverse circuit 17 to the control terminal of switches 18 and 19, respectively. In this way, switches 18 and 19 are turned on in response to logic-1 output from the respective output of flip-flop 16 to power the associated amplifiers 2 and 5. The complementary output of flip-flop 16 is also applied to the control terminal of reverse circuit 13 to cause it to establish reverse connections so that the outputs of memory 12 and gate 15 are coupled respectively to the terminals B and A of comparator 14.

The signal received by diversity branches A and B contains a sequence of frames identified by a unique frame sync code. This sync code is detected by a frame sync detector 21, which may form part of the demodulator. In response to the detection of a frame sync code, a sync detector output is generated in the form of a pulse by the frame sync detector 21. This pulse is applied to the control terminal of gate 11 and to a delay circuit 22 where it is delayed as shown in FIG. 2. The delayed version of the sync detect pulse is supplied to comparator 14 as an enable signal, and further applied to the control terminal of gate 15 and reverse circuit 17. Thus, reverse circuit 17 is briefly caused to establish reverse connections so that the true and complementary outputs of flip-flop 16 are coupled to switches 19 and 18, respectively. Gates 11 and 15 are successively enabled upon arrival of a frame by the outputs of frame sync detector 21 and delay circuit 22, respectively, so that one of the outputs of the diversity branches is passed through gate 11, stored in memory 12 and applied to reverse circuit 13, and the other signal is successively applied through gate 15 to reverse circuit 13.

Some provision is made in the diversity receiver so that, during initial operation of the receiver, flip-flop 15 is automatically set to turn on switch 18 and turn off switch 19. Thus, the signal received at antenna 1 is amplified by amplifier 2 and passed through strip line 3 to IF amplifier stage 7, and the field intensity of this output of diversity branch A is detected by field intensity detector 9, converted to digital form by A/D converter 10, and is stored into memory 12 in response to a frame sync detector pulse from detector 21 upon arrival of a frame.

During a subsequent short interval, a delayed version of the sync detector pulse is generated by delay circuit 22 and the logic states at the inputs of switches 18 and 19 change to logic levels 0 and 1, respectively, by reverse circuit 17 and gate 15 and comparator 14 are enabled. In this way, switch 19 is turned on instead to activate amplifier 5 to allow signal received at antenna 4 to be amplified and applied through strip line 6 to IF amplifier stage 7. The field intensity of this output of diversity branch B is therefore detected by field intensity detector 9, converted to digital form by A/D converter 10, and applied through gate 15 to comparator 14. If the output of diversity branch A is stronger than the output of diversity branch B, comparator 14 triggers the flip-flop 16 into a set condition, and switch 18 is turned on to activate amplifier 2 immediately following the trailing edge of the output of delay circuit 22. If the output of diversity branch A is weaker than the output of diversity branch B, comparator 14 resets the flip-flop and switch 19 is turned on instead to activate amplifier 5.

Detailed operation of the diversity receiver is as follows:

Assume that the signal at antenna 1 is initially stronger than the signal at antenna 4 and power switch 18 is turned on in response to the logic-1 output from the true output of flip-flop 16. Reverse circuit 13 is establishing normal connections so that the outputs of memory 12 and gate 15 are respectively coupled to the A and B terminals of comparator 14. Arrival of a frame causes an output signal from diversity branch A to be sampled and stored in memory 12 and applied to the A input terminal of comparator 14. Subsequently, delay circuit 22 produces an output which causes the reverse circuit 17 to briefly deactivate switch 18 and activate switch 19, so that an output signal from diversity branch B is applied through gate 15 to the B input terminal of comparator 14. If the output of diversity branch A is still stronger than the output of diversity branch B when comparator 14 is enabled by delay circuit 22, comparator 14 continues producing a logic-1 output at the set input of flip-flop 16. If the diversity branch A output 1 becomes weaker than the output of diversity branch B, comparator 14 produces a logic-1 output at the reset input of flip-flop 16 to turn on power switch 19 and causes reverse circuit 13 to couple the outputs of memory 12 and gate 15 to the B and A terminals of comparator 14, respectively.

With the power switch 19 and the reverse circuit 13 being activated, arrival of a subsequent frame causes an output from diversity branch B to be sampled and stored in memory 12 and applied to the B input of comparator 14. Subsequently, an output of diversity branch A is sampled by gate 15 and applied to the A input of comparator 14. If the output of diversity branch B is still stronger than the other, comparator 14 continues producing a logic-1 output at the reset input of flip-flop 16. If the diversity branch B output becomes weaker than the other signal, comparator 14 produces a logic-1 output at the set input of flip-flop 16 to turn on power switch 18 and causes reverse circuit 13 to couple the outputs of memory 12 and gate 15 to the A and B inputs of comparator 14, respectively.

It is seen that a field intensity comparison is made at periodic intervals between successively sampled field intensity values of the two diversity branches to switch one of the outputs of the diversity branches into circuit and cut off power supply to the other diversity branch. The overall power consumption of the receiver is therefore reduced.

What is claimed is:

1. A diversity receiver comprising:
   first and second diversity branches for respectively receiving a transmitted radio-frequency signal, the diversity branches respectively having first and second high-frequency amplifiers for amplifying the received signal to produce first and second diversity branch output signals;
   a diversity decision circuit coupled to said first and second diversity branches for generating a switching control signal identifying one of the first and second diversity branch output signals having a higher field intensity value than the other diversity branch output signal; and
   power switch means for coupling a voltage source to one of the high-frequency amplifiers of the first and second diversity branches in response to said switching control signal so that one of said first and second diversity branches having a higher field intensity is rendered active and the other diversity branch having a lower field intensity is rendered inactive,
   wherein said diversity decision circuit comprises:
      field intensity detector means coupled to said first and second diversity branches to produce an intensity signal;
      sampling pulse generator means for producing a first sampling pulse at periodic intervals and a second sampling pulse immediately following said first sampling pulse;
      first sampling means responsive to said first sampling pulse for sampling the intensity signal and producing a first sampled signal;
      second sampling means responsive to said second sampling pulse for sampling the intensity signal and producing a second sampled signal; and
      comparator means for comparing the first and second sampled signals and producing therefrom said switching control signal,
      said power switch means being responsive to said second sampling pulse for briefly deactivating the active diversity branch and briefly activating the inactive diversity branch.

2. A diversity receiver as claimed in claim 1, wherein said first and second diversity branches comprise first and second strip lines respectively, the first and second strip lines coupling the outputs of the first and second high-frequency amplifiers to said field intensity detector means.

3. A diversity receiver as claimed in claim 1 or 2, wherein said first sampling means includes:
   first gate means for gating the intensity signal in response to said first sampling pulse; and
   memory means for storing the gated intensity signal and supplying the stored intensity signal to said comparator means as said first sampled signal.

4. A diversity receiver as claimed in claim 1, wherein said comparator means includes:
   a comparator having first and second input terminals for producing one of a first and second output signals depending of relative values of signals applied to the first and second input terminals thereof;

a flip-flop connected to the output terminals of said comparator for producing a true output signal in response to said first output signal of the comparator and a complementary output signal in response to the second output signal of the comparator; and
a reverse circuit for coupling said first and second sampled signals to the first and second input terminals of the comparator in the presence of said true output signal and coupling said first and second sampled signals to the second and first input terminals of the comparator in the presence of said complementary output signals.

5. A diversity receiver as claimed in claim 1, wherein said sampling pulse generator means is responsive to a frame synchronization signal from either of the outputs of said first and second diversity branches for producing said first sampling pulse.

* * * * *